June 25, 1940.  F. BUSSE  2,205,615

APPARATUS FOR THE MAKING OF CONTACT COPIES OF FILMS

Filed Oct. 27, 1938

Inventor
Ferdinand Busse
By His Attorney

Patented June 25, 1940

2,205,615

UNITED STATES PATENT OFFICE 2,205,615

APPARATUS FOR THE MAKING OF CONTACT COPIES OF FILMS

Ferdinand Busse, Munich, Germany, assignor, by mesne assignments, to General Aniline & Film Corporation, New York, N. Y., a corporation of Delaware Application October 27, 1938, Serial No. 237,236
In Germany October 29, 1937

4 Claims. (Cl. 95—75)

My present invention relates to an apparatus for producing contact copies of films particularly cinematographic films onto paper strips.

It has already been proposed to produce prints of single pictures taken on normal motion picture film by contact printing onto perforated paper strips. The method necessitated special apparatus for feeding the paper strip and the film strip for one picture space after each exposure.

Furthermore devices are known which enable a simultaneous printing onto a paper strip of several pictures taken on a film strip.

The object of the invention resides in the provision of an apparatus for the production of contact prints on paper strips which apparatus can be readily incorporated in any of the known photographic printing machines, thus obviating the necessity of any special copying apparatus for the purpose in question.

Further and additional objects will appear from the following detailed specification.

Reference is made to the accompanying drawing in which

Figure 1:
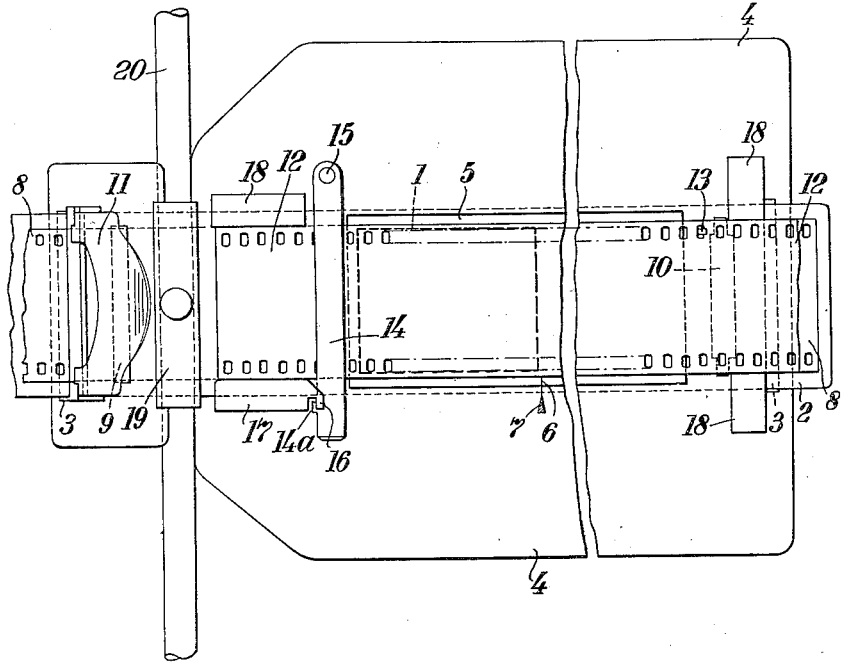
Fig. 1 is a plan view of the embodiment of the invention shown as a side elevation in Fig. 2.

The invention consists in arranging on the printing surface of a normal copying apparatus means for feeding and tightening the film and the paper strip and means for guiding a masking sheet adapted to be shifted from one picture printing position to the next. It has proved advantageous to arrange all the aforesaid means on a foil which may be placed on the printing surface. The masking sheet consists of a material permeable to light but only to inactinic light. For the uniform shifting of the masking sheet the latter carries markings which correspond to a similar marking on the foil.

As against the known devices, in which the various negative pictures had to be transferred picture by picture into the aperture on the masking means, the present apparatus has the advantage of an essential protection of the film material and at the same time considerable saving in labor, since the paper strip and the film strip need only be placed into the apparatus once and are then tightly and irremovably fastened. This relieves the operator of any care which he must otherwise take in order to maintain a fixed relation between film strip and paper strip. A further advantage resides in the fact, that any existing copying apparatus may be employed for the making of contact copies from film strips onto paper strips.

The invention will be better understood with reference to the modification of the apparatus shown in the drawing.

In Fig. 1 the masking sheet 2, which is provided with a picture aperture 1 equal in size to a single picture of the film strip, consists preferably of a sheet of cellulose or the like, dyed red. The masking sheet 2 rests in specially provided guiding slits 3 in the foil 4. The masking sheet is so adjusted, that the aperture 1 is close to the edge of the opening 5 in the foil 4.

A series of markings 6 are provided on the masking sheet 2 to indicate the shift necessary for each picture. The markings are spaced apart the same distances as the pictures on the film. Another marking 7 is provided on the copying foil 4, so that only the masking sheet must be moved on, after it has been brought into the position at which the markings 6 and 7 correspond, by one space between two of the marks 6 for making a print of a new picture.

The opening 5 of foil 4, which comprises a plurality of picture lengths, lies next to the printing surface. The negative film 8 is introduced from the left side through a slit 9 of the copying foil 4 so that both longitudinal inner edges of opening 5 contact with the outer margin of a picture. 10 is the slit for exit of the negative film strip. In the position just described the film strip 8 is tightly fastened by means of a clamping lever 11. A strip of photosensitive paper 12, the length of which is at least as great as that of opening 5 in foil 4, is laid over the negative film strip 8,—after having marked the necessary exposure time on the back of the paper strip—which can be done easily, since the pictures can be viewed through the transparent masking sheet 2.

The paper strip is fastened at its one end to the tongue 13 of the copying foil, and by means of a clamping ledge 14 at its other end to the foil 4. The ledge 14 pivots about the pin 15 and is provided at its front free end with a tongue 14a which engages a corresponding attachment of the guiding ledge 17 of foil 4. The remaining guiding ledges are numbered 18. After the film and paper strips have been inserted, the masking strip 2 is shifted to under the first negative picture while observing the markings 6 and mark 7 on foil 4. The printing of the said picture is effected with due regard to the predetermined exposure time; the masking sheet 2 is then shifted to the next mark 6 and the second picture printed and so forth until all the pictures situated in the opening 5 are copied.

During the copying the film strip and the paper strip are held fast, so that there is absolute certainty that the exposed paper strip is a complete duplicate of the negative film as regards correct succession of the pictures and the space therebetween, although the complete length of film situated in opening 5 is not printed simultaneously but picture for picture in succession.

The printing foil 4 may be fastened to a ledge 20 on the printing apparatus. The ledge 20 may be, for instance, a part of the pivoting mask support.

Figure 2:
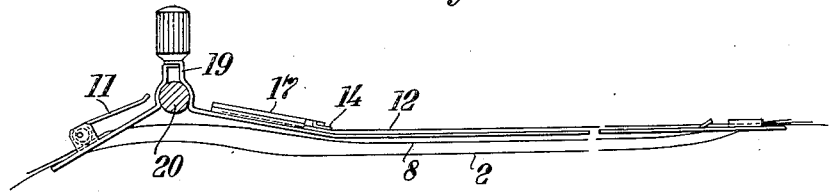
Fig. 2 is a side elevational view of the device according to the invention.

Fig. 2 shows the arrangement described above in side elevation. Identical reference numerals indicate corresponding parts. The figure is otherwise self explanatory.

Figure 3:
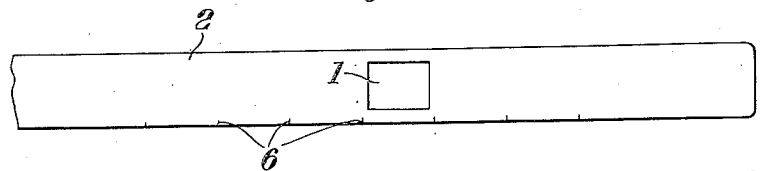
Fig. 3 is a plan view of the masking sheet described with more detail hereinafter.

Fig. 3 shows the masking sheet 2 with picture aperture 1 and markings 6.

What I claim is:

1. A device of the character described comprising a foil having an opening therein at least as wide as an individual picture of a negative film strip and at least as long as a plurality of said pictures, said foil being adapted to be placed on the copying surface of a normal photographic printing apparatus, parallel slits being provided in said foil at opposite longitudinal ends of said foil opening for the insertion of said negative film strip and a light sensitive paper strip, clamping means and guiding means on said foil for the guiding and clamping of said film and paper strips, a masking sheet having an exposure aperture corresponding in size with the individual pictures of said film strip, markings being provided on said masking sheet spaced apart the length of an individual picture of said film and being adapted to be brought into agreement with a fixed mark on said foil.

2. Device according to claim 1 wherein the masking sheet consists of a material permeable to inactinic light but impermeable to light capable of substantially affecting the light sensitive paper.

3. A device for the making of contact copies of photographic films comprising a foil having an opening therein at least as wide as an individual picture of a negative film strip and at least as long as a plurality of said pictures, said foil being adapted to be placed on the copying surface of a normal photographic printing apparatus, a masking sheet having an exposure aperture corresponding in size to an individual picture area of said film and mounted on said foil for longitudinal movement of said exposure aperture with respect to said foil opening, and means on said foil for holding said negative strip and a light sensitive paper strip in printing relation with respect to said foil opening and with said paper strip above said masking sheet.

4. A device for the making of contact copies of photographic films comprising a foil having an opening therein at least as wide as an individual picture of a negative film strip and at least as long as a plurality of said pictures, said foil being mountable on the copying surface of a normal photographic printing apparatus, a masking sheet having an exposure aperture corresponding in size to an individual picture area of said film and mounted on said foil for longitudinal movement of said exposure aperture with respect to said foil opening, indicia on said masking sheet and on said foil by the aid of which said masking sheet may be shifted along said foil opening by single picture lengths, means on said foil for guiding the negative film strip, a light sensitive paper strip, and said masking sheet on said foil with said positive strip above said negative strip, masking member, and foil opening, said guiding means including parallel slits in said foil at opposite longitudinal ends of said foil opening, and clamping means on said foil for holding said negative film and said paper strip.

FERDINAND BUSSE.